United States Patent [19]
Miller

[11] Patent Number: 5,639,435
[45] Date of Patent: Jun. 17, 1997

[54] METHOD FOR PRODUCING SULFUR HEXAFLUORIDE

[76] Inventor: Jorge Miller, 3300 Sage Rd., Apt. 9204, Houston, Tex. 77056

[21] Appl. No.: 736,338

[22] Filed: Oct. 23, 1996

[51] Int. Cl.$^6$ .................................. C01B 17/45
[52] U.S. Cl. .................. 423/469; 423/489; 423/539; 423/565
[58] Field of Search .................... 423/467, 469, 423/489, 539, 561.1, 565

[56] References Cited

U.S. PATENT DOCUMENTS

| | | | |
|---|---|---|---|
| 2,883,267 | 4/1959 | Muetterties | 423/469 |
| 2,897,055 | 7/1959 | Muetterties et al. | 423/469 |
| 2,992,073 | 7/1961 | Tullock | 423/469 |
| 3,054,661 | 9/1962 | Muetterties | 423/469 |
| 3,399,036 | 8/1968 | Kleinberg et al. | 423/489 |
| 4,039,646 | 8/1977 | Massonne et al. | 423/469 |

OTHER PUBLICATIONS

Mellor, "A Comprehensive Treatise on Inorganic & Industrial Chemistry", vol. X, QD 31.M4, 1947, pp. 630–631. (no month).

Chemical Abstract, 74:49211m, "Formation of Sulfur Difluoride . . . with Silver Fluoride", vol. 74, Mar. 1971.

*Primary Examiner*—Ngoc-Yen Nguyen
*Attorney, Agent, or Firm*—Browning Bushman

[57] ABSTRACT

The present invention is directed to methods for preparing sulfur hexafluoride by reacting sulfur tetrafluoride with oxygen. The sulfur tetrafluoride is prepared by contacting molten sulfur with a metal fluoride to produce sulfur tetrafluoride and a metal sulfide. In a preferred method, the metal fluoride is regenerated from the metal sulfide by reacting the metal sulfide with hydrofluoric acid in the presence of oxygen. The preferred metal fluorides are the fluorides of copper, silver, mercury and mixtures thereof.

18 Claims, No Drawings

1

METHOD FOR PRODUCING SULFUR HEXAFLUORIDE

BACKGROUND OF THE INVENTION

I. Field of the Invention

The present invention generally relates to methods for preparing sulfur hexafluoride. More specifically, the present invention is directed to methods employing the reaction of elemental sulfur with a metal fluoride as the fluorinating agent to produce sulfur tetrafluoride which is, in turn, reacted with oxygen to produce sulfur hexafluoride.

II. Description of the Background

Sulfur hexafluoride ($SF_6$) is particularly stable and resistant to attack. Because of its chemical inertness, high dielectric constant and molecular weight, sulfur hexafluoride has often been used as a gaseous insulator in high voltage generators and other electrical equipment. Accordingly, safe and efficient methods for producing sulfur hexafluoride are desirable.

Sulfur hexafluoride is typically manufactured by the direct fluorination of sulfur vapor with pure, gaseous fluorine. Sulfur hexafluoride is the principal reaction product along with traces of sulfur tetrafluoride ($SF_4$) and disulfur decafluoride ($S_2F_{10}$). The reaction product of this direct formation is initially scrubbed with caustic. Any disulfur decafluoride present is decomposed by heating to about 400° C. Scrubbing again with caustic removes the resulting decomposition products.

These prior methods for producing sulfur hexafluoride using pure, gaseous fluorine require the consumption of large quantites of energy in the electrolytic production of pure, gaseous fluorine. Further, fluorine, because of its extremely high reactivity and toxicity, requires special safety procedures for handling. These methods also produce polluting and, in fact, toxic waste products. Accordingly, there has been a long felt by unfulfilled need for safer, less polluting, more efficient and more economical methods for producing sulfur hexafluoride.

The present invention solves those needs.

SUMMARY OF THE INVENTION

The present invention is directed to a process for producing sulfur hexafluoride using metal fluorides as the fluorinating agent. Metal fluorides are significantly safer than the pure, gaseous fluorine used in current manufacturing processes. The metal fluorides may be regenerated by reacting the intermediate metal sulfides with hydrofluoric acid and oxygen, thus eliminating the metal sulfide by-products. Because the intermediate metal sulfides in the reactions of the present reaction are convened back to the initial metal fluorides for recirculation in the process, pollutants and by-products are minimized. Because all of the steps employed in the methods of the present invention are exothermic, the high consumption of energy required in the electrolytic production of pure, gaseous fluorine used in the current manufacturing processes may be eliminated. Further, the dangers associated with the use of highly reactive and toxic fluorine gas have been eliminated. The present invention provides a continuous manufacturing process with reduced levels of danger and pollution. Thus, the process of the present invention is safer, less polluting, more efficient and more economical than the current manufacturing processes.

In the methods of the present invention sulfur hexafluoride is produced by contacting sulfur tetrafluoride with oxygen at a temperature from about 100° C. to about 550° C. to produce sulfur hexafluoride and sulfur dioxide, following which the sulfur hexafluoride may be recovered and, if desired, purified. In the preferred methods of the present invention, sulfur tetrafluoride is produced by contacting molten sulfur with a metal fluoride selected from the group consisting of the fluorides of copper, silver, mercury and mixtures thereof. In the presently most preferred method, powdered silver fluoride is contacted with liquid sulfur at a temperature from about 113° C. to about 444° C. to produce sulfur tetrafluoride which is separated and contacted with oxygen at a temperature of about 500° C.

In another aspect of the present invention, metal sulfide produced as a by-product of the foregoing reactions may be recovered and converted to metal fluoride for further use in the process. In this aspect of the present invention, the metal sulfide by-product is reacted with hydrofluoric acid and oxygen to regenerate metal fluoride for recirculation as the fluorinating agent in the process. Sulfur dioxide produced as a by-product in this step may be recovered and sold or used to generate further commercial products by any conventional method. Thus, the presnt invention has eliminated all of the undesirable and potentially polluting by-products of the process.

All of the foregoing reactions are exothermic. Accordingly, the present invention provides energy efficient methods for producing sulfur hexafluoride. By using metal fluorides as the fluorinating agent, the energy inefficient step of producing pure, gaseous fluorine for use as the fluorinating agent has been eliminated. Further, the methods of the present invention provide safer processes for manufacturing sulfur hexafluoride by eliminating the use of the highly reactive and dangerous pure, gaseous fluorine as the fluorinating agent.

Thus, the longfelt but unfulfilled need for safer, less polluting, more efficient and more economical methods for manufacturing sulfur hexafluoride has been met. These and other meritorious features and advantages of the present invention will be more fully appreciated from the following description and claims.

DETAILED DESCRIPTION OF THE PREFERRED EMBODIMENTS

The present invention provides an improved, safer, less polluting, more efficient and more economical process for manufacturing sulfur hexafluoride. The process comprises the oxidation of sulfur tetrafluoride to produce sulfur hexafluoride and sulfur dioxide in accord with the following equation:

$$3SF_4 + O_2 \rightarrow 2SF_6 + SO_2 \tag{1}$$

In the reaction of equation 1, sulfur tetrafluoride reacts in an exothermic reaction with oxygen to form a sulfur dioxide by-product and sulfur hexafluoride. While this reaction may be carried out at temperatures from about 100° C. to about 550° C., it is preferably conducted at temperatures from about 480° C. to about 520° C. In the most preferred method, this reaction is conducted at a temperature of about 500° C. in a conventional burner fed with air or oxygen. While the reaction progresses faster with increasing temperature, sulfur hexafluoride begins to decompose at temperatures exceeding about 500° C. Accordingly, a compromise must be reached between the speed of reaction and the decomposition of the desired reaction product.

Gases from the burner, including both sulfur hexafluoride and sulfur dioxide, under pressure are cooled and liquified in a conventional heat exchanger. The liquified gases are fed to a conventional distillation column where they are separated. The liquid sulfur dioxide by-product may be recovered and sold or used in further manufacturing processes. The liquid sulfur hexafluoride is vaporized under pressure and scrubbed with caustic soda by conventional methods to remove any remaining impurities. The purified sulfur hexafluoride is dried, cooled, reliquified and conveyed to storage or transport cylinders by conventional methods.

In the preferred methods of the present invention, sulfur tetrafluoride is produced by reacting elemental sulfur with a metal fluoride as the fluorinating agent in accord with the following equation:

$$4MF_x + 3xS \rightarrow 2M_{(2/x)}S + xSF_4 \tag{2}$$

In the reaction of equation 2, M is a metal selected from the group consisting of copper, silver, mercury and mixtures thereof and x is 1 or 2 as required by the valence of the metal. This reaction is exothermic. In the presently preferred embodiment the fluorinating agent is silver fluoride and the reaction proceeds as follows:

$$4AgF + 3S \rightarrow 2Ag_2S + SF_4 \tag{3}$$

In the exothermic reaction of equation 3, silver fluoride is the fluorinating agent for elemental sulfur to produce the intermediate products, silver sulfide and sulfur tetrafluoride.

In the presently preferred embodiment, a mixture of powdered silver fluoride and powdered sulfur in an approximately stoichiometric ratio is continuously charged to a conventional double screw, conveyor reactor. Alternatively, silver fluoride is added in excess of the stoichiometric ratio. The reactor is suitably enclosed to operate under pressure and includes conventional heating and cooling means. The reaction is preferably conducted in a temperature range between the melting and boiling points of sulfur so that the silver fluoride can react with molten sulfur. Thus, the double screw, conveyor reactor should include means for maintaining the temperature between at least about 110° C. and about 445° C. In the most preferred embodiment, this reaction is conducted at a temperature between about 113° C. and about 444° C.

In another aspect of the present invention, the metal sulfide produced as an intermediate by-product in the production of sulfur hexafluoride may be converted to metal fluoride for reuse in a continuous process. Regeneration proceeds in accord with the following equation:

$$2M_xS + 4HF + 3O_2 \rightarrow (4/x)MF_x + 2SO_2 + 2H_2O \tag{4}$$

In the reaction of equation 4, M and x are as defined above for equation 2. The metal sulfide by-product is converted to fresh metal fluoride in an exothermic reaction by reacting the metal sulfide with hydrofluoric acid in the presence of oxygen. In the presently preferred embodiment, silver fluoride is regenerated from silver sulfide according to the following equation:

$$2Ag_2S + 4HF + 3O_2 \rightarrow 4AgF + 2SO_2 + 2H_2O \tag{5}$$

In the exothermic reaction of equation 5, silver sulfide is converted to silver fluoride by reaction with hydrofluoric acid in the presence of oxygen or air.

The metal sulfide coming out of the twin screw, conveyor reactor is fed to a conventional multiple bed fluidized reactor or plugged flow reactor. In the presently most preferred embodiment the metal sulfide is contacted with a countercurrent flow of hydrofluoric acid vapor mixed with oxygen.

The regeneration reaction may be conducted at a temperature from about 150° C. to about the melting point of the metal fluoride. With silver fluoride having a melting point of 435° C., the presently most preferred regeneration step is preferably conducted at a temperature from about 350° C. to about 435° C.

The powdered metal fluoride regenerated in this process is preferably mixed in a drum mixer with less than a stoichiometric amount of powdered sulfur for reintroduction into the continuous feed of the conveyor reactor used in the process. Sulfur dioxide produced as a by-product of the regeneration step is further processed in any conventional manner. For example, the sulfur dioxide by-product may be absorbed in caustic to produce sodium bisulfite or recovered, purified and sold as described above.

The foregoing description of the invention has been directed in primary part to a particular preferred embodiment in accordance with the requirements of the Patent Statutes and for purposes of explanation and illustration. It will be apparent, however, to those skilled in the art that many modifications and changes in the specifically described methods may be made without departing from the true scope and spirit of the invention. For example, metal fluoride may be regenerated from metal sulfide by a number of conventional techniques described in the literature. In one such technique, the metal sulfide may be converted to the oxide or carbonate followed by fluorination with hydrofluoric acid. Therefore, the invention is not restriced to the preferred embodiment described and illustrated but covers all modifications which may fall within the scope of the following claims.

What is claimed is:

1. A method for producing sulfur hexafluoride, comprising:

preparing a mixture of sulfur and silver fluoride so that the ratio of silver fluoride to sulfur is stoichiometric or greater;

charging said mixture to a double screw, conveyor reactor;

reacting said sulfur with said silver fluoride at a temperature between the melting and boiling points of sulfur in said conveyor reactor to produce silver sulfide and gaseous sulfur tetrafluoride;

recovering said gaseous sulfur tetrafluoride from said reactor;

oxidizing said sulfur tetrafluoride in a burner by reacting with oxygen at a temperature from about 100° C. to about 550° C. to produce gaseous sulfur hexafluoride and sulfur dioxide; and recovering said sulfur hexafluoride.

2. The method of claim 1 wherein said sulfur tetrafluoride is oxidized at a temperature from about 480° C. to about 520° C.

3. The method of claim 2 wherein said reacting occurs at a temperature from about 113° C. to about 444° C.

4. The method of claim 1 further comprising generating fresh silver fluoride by recovering and contacting said silver sulfide with hydrofluoric acid and oxygen in a fluid bed reactor at a temperature from about 150° C. to about the melting point of silver fluoride.

5. The method of claim 4 wherein said hydrofluoric acid and said oxygen are passed through said fluid bed reactor in a countercurrent direction with respect to said silver sulfide.

6. The method of claim 5 wherein said fresh silver fluoride is mixed with sulfur so that the ratio of silver fluoride to sulfur is greater than stoichiometric and is charged into said double screw, conveyor reactor.

7. The method of claim 1 further comprising purifying said recovered sulfur hexafluoride.

8. A method for producing sulfur hexafluoride comprising:

contacting sulfur tetrafluoride with oxygen at a temperature from about 100° C. to about 550° C. to produce sulfur hexafluoride and sulfur dioxide; and recovering said sulfur hexafluoride.

9. The method of claim 8 further comprising producing said sulfur tetrafluoride by contacting sulfur with a metal fluoride selected from the group consisting of copper fluoride, silver fluoride, mercury fluoride and mixtures thereof at a temperature between the melting and boiling points of sulfur.

10. A method for producing sulfur hexafluoride, comprising:

contacting sulfur with a metal fluoride to produce a metal sulfide and sulfur tetrachloride; and oxidizing said sulfur tetrafluoride with oxygen at a temperature from about 100° C. to about 550° C. to produce sulfur hexafluoride.

11. The method of claim 10 wherein said sulfur tetrafluoride is oxidized by contacting said sulfur tetrafluoride with oxygen at a temperature in a range from about 480° C. to about 520° C.

12. The method of claim 10 wherein said metal fluoride has the formula $MF_x$ where M is a metal selected from the group consisting of copper, silver, mercury and mixtures thereof and x is 1 or 2 according to the valence of said metal.

13. The method of claim 10 wherein said contacting occurs at a temperature between the melting and boiling points of sulfur.

14. The method of claim 13 wherein said sulfur tetrafluoride is oxidized by contacting said sulfur tetrafluoride with oxygen at a temperature in a range from about 480° C. to about 520° C.

15. The method of claim 14 wherein said metal fluoride is silver fluoride.

16. The method of claim 10 further comprising generating fresh metal fluoride by contacting said metal sulfide with hydrofluoric acid and oxygen.

17. The method of claim 16 wherein said generating occurs at a temperature from about 150° C. to the melting point of said metal fluoride.

18. The method of claim 10 further comprising recovering and purifying said sulfur hexafluoride.

* * * * *